Oct. 13, 1953  H. GOLLE  2,655,125
DUAL FUNCTION INDICATOR
Filed March 20, 1951
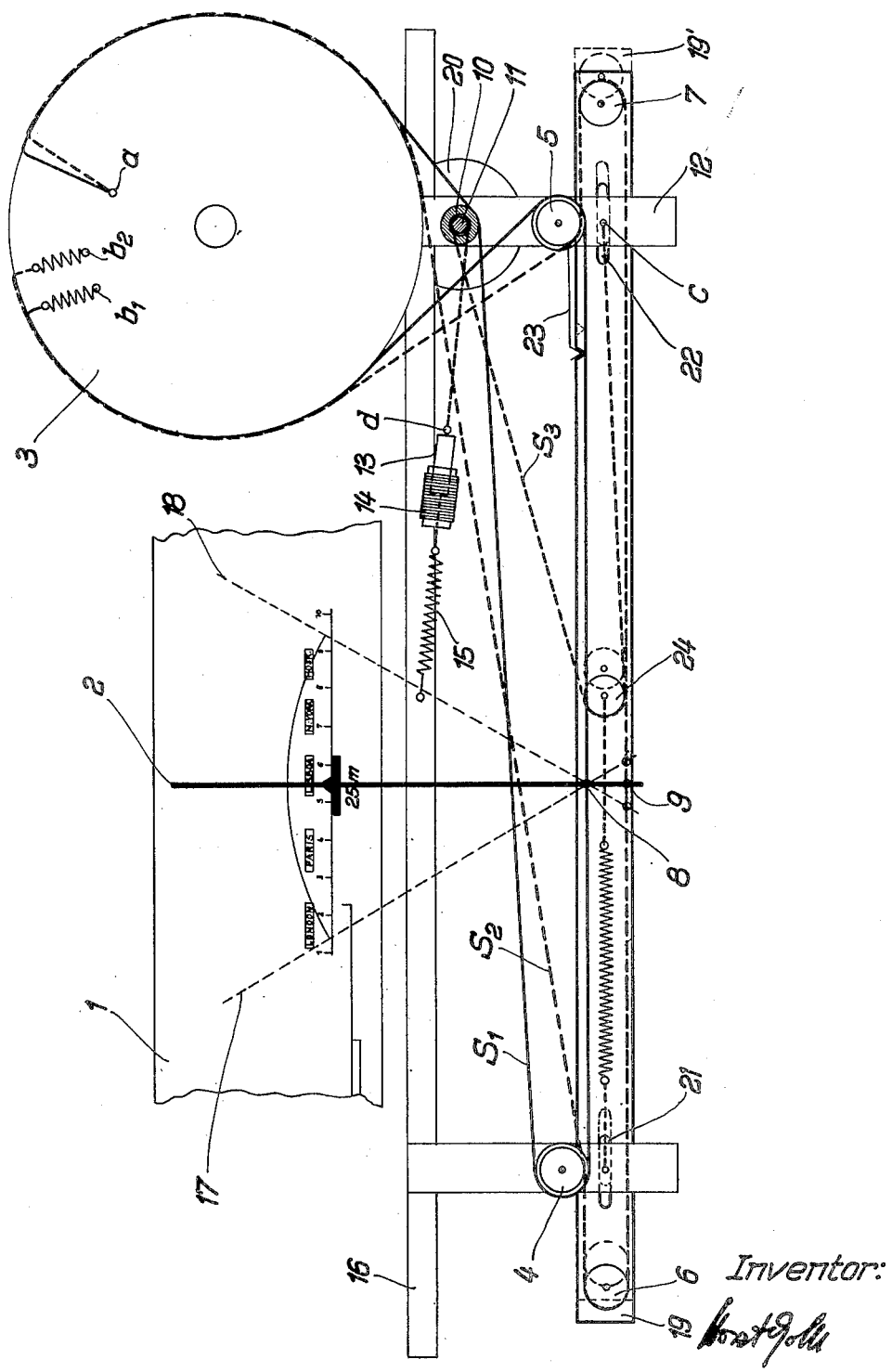
Inventor:

Patented Oct. 13, 1953

2,655,125

UNITED STATES PATENT OFFICE 2,655,125

DUAL FUNCTION INDICATOR

Horst Golle, Berlin-Steglitz, Germany

Application March 20, 1951, Serial No. 216,497
In Germany March 21, 1950

5 Claims. (Cl. 116—124.1)

This invention relates to an indicating device for electrical apparatus or the like, in particular, however, for tuning indicators of radio sets in which two functions shall be indicated by the same pointer. Such indicators are generally required for electrical tunable apparatus and, preferably, for tuning indicators of radio sets. Usually, this task is solved by separated indicators.

The object of this invention, however, is to simplify such devices by providing an apparatus with only one pointer which is employed for simultaneously indicating two different functions.

The principle of the present invention consists in fastening the pointer employed for indicating simultaneously at two drives serving as tuning indicators and being actuated by the same driving member. In addition, by operating another drive, which has quite another function in no connection with the tuning operation, one of the first-mentioned two drives is moved, without any reaction on their common driving member, in such a manner that an angular adjustment of the pointer takes place. Consequently, the dual function indicator described in this invention will work so that, firstly, the pointer in its normal position will indicate one function, operating e. g. as tuning indicator, and that, secondly, this position will serve as initial position of the additional function and its indication by angular movement of the pointer. An indicator of this kind will turn out to be exceptionally advantageous as tuning indicator of radio sets with band spreading. In this case, the pointer will at first be employed, in its "normal" position, as tuning indicator, and then, by its angular movement, for indicating an additional function which is in no connection with the function which was indicated before.

The present invention will now be described in detail in connection with the drawing showing, as an example, an embodiment of the invention employing cord drives at a station dial of a radio receiver with band spreading. In this drawing, 1 is the dial plate with the names of the stations across which, by means of the cord drives $S_1$ and $S_2$, pointer 2 is shifted to and fro in a vertical position for indicating stations of all coverages. One end of the two cord drives $S_1$ and $S_2$ is fastened at point "$a$" of the cord pulley 3. The cords are strung from "$a$" across the guide pulleys 4 and 5, respectively 6 and 7, back to cord pulley 3 where their other ends are fastened, by means of springs, at the points $b_1$ and $b_2$. Pointer 2 is attached to the two cord drives $S_1$ and $S_2$ at the two points 8 of cord drive $S_1$ and 9 of cord drive $S_2$. If shaft 10 is actuated, e. g. by means of an operating knob, said pointer 2, in a vertical position, will be moved to and fro as shown in the drawing.

According to the invention, still another additional cord drive $S_3$ will be provided which can be operated by means of shaft 11, which is suitably mounted within the hollow axle of shaft 10. After running across the guide pulley 24, drive $S_3$ is fastened, at one end, to point "$c$" at the angle bar 12 of the chassis 16 and, with its other end "$d$," to the iron core 13 of coil 14 which, by means of spring 15, is attached to the chassis 16. This drive accomplishes an angular movement of the pointer 2 as shown by the dashed positions 17 and 18 in the drawing. If said drive $S_3$ is operated, the guide pulleys 6 and 7 of cord drive $S_2$, supported by bar 19, will be shifted e. g. to the right, so that bar 19 will come into the new position 19'. By this movement of bar 19 the lower part of drive $S_2$ between the two pulleys 6 and 7 will be moved to the right together with these pulleys 6 and 7. Therefore, pointer 2 will be moved to the inclined position 17 being fastened, at point 9, to the cord drive $S_2$. On the other hand, by displacing cord drive $S_3$ to the left, pointer 2 can be moved to a corresponding inclined position on the opposite side, e. g. to position 18.

In the present example, this angular movement of pointer 2 is employed for the indication at band spreading. Coil 14, the iron core of which is displaced by cord drive $S_3$, is shunted with the oscillator circuit and, by changing its inductance in consequence of the displacement of its iron core, will accomplish the band spreading. Therefore, it will be possible to adjust the pointer, by means of the first drive, at first to the wished band, and then, by angular adjustment accomplished by the additional drive, to tune in, with spreaded indication, exactly to the single stations.

The indicating dial must be fitted with suitable scales. Thus, in the example shown in the drawing pointer 2 in its normal vertical position was, for example, adjusted to the short wave band 25; at band spreading, the inclined pointer indicates, by operation of cord drive $S_3$, the single transmitter stations of the short wave 25 meters band.

As was indicated in the drawing, the bar 19 is movable, owing to the slots 21 and 22, so that it can follow without any difficulties the movements of cord drive S3. 20 is the fly weight usually employed in such cord drives. The spring 23 in connection with a corresponding groove of the bar 19 serves for perceptibly designating the vertical position of the pointer.

Of course, the present invention does not principally require the pointer to be operated by cord drives but the pointer can be actuated by any other suitable means hitherto known.

What I claim is:

1. A dual indicator system for radio sets and for indicating the position of their adjustable tuning members comprising one indicating pointer, three drives, two adjustable tuning members and two driving members, said pointer being rotatably attached to two of said drives, the first of said driving members being coupled with said two drives to which said pointer is rotatably attached, and adapted to adjust the position of one of said adjustable tuning members and to move simultaneously two of said drives, thus moving by its actuation said pointer in a rectilinear direction to give a first indication, the second of said driving members being arranged independently of said first driving member and being not in connection with said one adjustable tuning member and coupled with the third of said drives adapted to adjust the position of the second of said adjustable tuning members and to move by its actuation one of said other two drives without reaction on said first driving member and said first adjustable tuning member in such a way as to produce an angular movement of said pointer, thus effecting a second indication.

2. A dual indicator system as claimed in claim 1, wherein said three drives are constructed as cord drives.

3. A dual indicator system for radio sets for receiving at least the medium wave and the short wave ranges and for indicating the position of their adjustable tuning members, comprising one indicator pointer, three cord drives, one cord pulley together with a plurality of guide pulleys, two adjustable tuning members and two driving members, said pointer being rotatably attached to two of said cord drives both adapted to be simultaneously actuated by said cord pulley which is coupled with one of said driving members adapted to drive one of said adjustable tuning members, and to move said pointer in a rectilinear direction to give an indication at least within the medium wave range, the third of said cord drives being not in connection with said one adjustable tuning member and arranged independently of said first driving member and coupled with the second of said driving members which is adapted to actuate the second of said adjustable tuning members, said third cord drive being adapted to move by its actuation one of said guide pulleys into lateral direction whereby one of said other two drives is moving without reaction on said first driving member and said first adjustable tuning member in such a way as to produce an angular movement of said pointer, thus effecting a second indication within the short wave range in accordance with the position of said second adjustable tuning member.

4. A dual indicator system for radio sets as claimed in claim 3, wherein said second adjustable tuning member consists of a coil containing a movable iron core, said iron core being attached to the third of the cord drives, thus being moved if said third cord drive is actuated.

5. In a dual indicator system for radio sets as claimed in claim 3, the use of a groove and detent mechanism for rendering perceptible the vertical position of the pointer.

HORST GOLLE.

References Cited in the file of this patent

UNITED STATES PATENTS

| Number | Name | Date |
|---|---|---|
| 2,165,416 | Rydstedt | July 11, 1939 |
| 2,173,503 | Strassenburg | Sept. 19, 1939 |
| 2,295,387 | Creager | Sept. 8, 1942 |